United States Patent
Kim et al.

(10) Patent No.: US 8,213,058 B2
(45) Date of Patent: Jul. 3, 2012

(54) IMAGE FORMING APPARATUS AND METHOD FOR REDUCING NOISE

(75) Inventors: Hyou-jin Kim, Anyang-si (KR); Seok-heon Chae, Hwanseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 986 days.

(21) Appl. No.: 12/189,937

(22) Filed: Aug. 12, 2008

(65) Prior Publication Data

US 2009/0086282 A1    Apr. 2, 2009

(30) Foreign Application Priority Data

Sep. 28, 2007   (KR) .................. 10-2007-0098162

(51) Int. Cl.
  *H04N 1/00*   (2006.01)
  *H04N 1/40*   (2006.01)
  *H04N 1/04*   (2006.01)
  *G03B 27/80*  (2006.01)
  *G03B 27/10*  (2006.01)

(52) U.S. Cl. ........ 358/463; 358/405; 358/448; 358/474; 358/481; 355/81; 355/84

(58) Field of Classification Search ............... 358/1.15, 358/1.9, 1.5, 474, 401, 505, 481, 448, 463; 355/81, 84, 128, 25
See application file for complete search history.

(56) References Cited

U.S. PATENT DOCUMENTS

| | | | |
|---|---|---|---|
| 7,136,605 B2 * | 11/2006 | Tsunoda et al. | 399/91 |
| 7,156,391 B2 * | 1/2007 | Okamoto et al. | 271/258.01 |
| 7,215,783 B2 * | 5/2007 | Tsunoda et al. | 381/56 |
| 2002/0186984 A1 * | 12/2002 | Koike | 399/82 |
| 2003/0035130 A1 * | 2/2003 | Able et al. | 358/1.14 |
| 2004/0004732 A1 * | 1/2004 | Takeda et al. | 358/1.13 |
| 2004/0109703 A1 * | 6/2004 | Koike | 399/82 |
| 2007/0121156 A1 * | 5/2007 | Ando | 358/1.15 |

* cited by examiner

*Primary Examiner* — Benny Q Tieu
*Assistant Examiner* — Ngon Nguyen
(74) *Attorney, Agent, or Firm* — Staas & Halsey LLP

(57) ABSTRACT

An image forming apparatus including: a user interface unit to display a user interface to select one or more low noise modes to reduce noise produced during a print standby state and a printing state of the image forming apparatus; and a controller to control the driving of a laser scanning unit and to control a print speed, according to one or more of the selected low noise modes selected through the user interface. Therefore, noise generated in the print standby state, and/or the printing state, are reduced, according to a low noise mode selected by a user.

22 Claims, 4 Drawing Sheets

IMAGE FORMING APPARATUS AND METHOD FOR REDUCING NOISE

CROSS-REFERENCE TO RELATED APPLICATION

This application claims the benefit of Korean Application No. 2007-98162, filed Sep. 28, 2007, in the Korean Intellectual Property Office, the disclosure of which is incorporated herein by reference.

BACKGROUND OF THE INVENTION

1. Field of the Invention

Aspects of the present invention relate to an image forming apparatus and a method for reducing noise, and more particularly, to an image forming apparatus capable of providing a user interface (UI), through which a user can select a low noise mode, and is capable of controlling a laser scanning unit and a print speed, according to the selected low noise mode.

2. Description of the Related Art

Examples of image forming apparatuses utilizing electrophotographic processes include copiers, laser printers, light emitting diode printers, plain paper facsimile machines, combination devices, and the like.

Image forming apparatuses utilizing electrophotographic processes perform operations, such as, charging, exposing, developing, transferring, fixing, and discharging, in order to form images on recording media. Such operations may be performed by a driving motor, which drives a laser scanning unit, a developing device, a transferring device, and a fixing device.

Image forming apparatuses generally drive laser scanning units before print data is received, to reduce the time required to perform printing. This operation mode (hereinafter, referred to as "standby mode") may be executed when events take place in image forming apparatuses. Such events may include an input using operation keys of the image forming apparatus, opening and/or closing cassette covers, or opening and/or closing scanning unit covers.

Image forming apparatuses operate in the standby mode, every time such events are detected. Specifically, operations resulting from a user's mistake are also detected as events, so the standby mode may be executed, and the laser scanning units may be driven. Accordingly, noise may be generated, due to the driving of laser scanning units in the standby mode and the printing mode.

SUMMARY OF THE INVENTION

Aspects of the present invention relate to an image forming apparatus that is capable of providing a user interface (UI), through which a user can select a low noise mode, and that is capable of controlling the driving of a laser scanning unit and a print speed, according to the low noise mode, so that noise may be reduced, and to a method for reducing noise.

According to an exemplary embodiment of the present invention, there is provided an image forming apparatus including: a user interface unit to display a user interface, which provides a plurality of low noise modes, in order to perform noise reduction in each state of the image forming apparatus; and a controller, to control the driving of a laser scanning unit, and to control a print speed, according to the selected low noise mode.

According to an aspect of the present invention, if a first low noise mode, to control noise generated in the print standby state, is selected from among the plurality of low noise modes, the controller may control the laser scanning unit to not be driven in the print standby state.

According to an aspect of the present invention, if a second low noise mode, to control noise generated in the printing state, is selected from among the plurality of low noise modes, the controller may control the laser scanning unit to be driven at a first drive speed in the print standby state, and may control the laser scanning unit to be driven at a second drive speed when the printing state is initiated.

According to an aspect of the present invention, the first drive speed and second drive speed may be slower than a normal speed, and the second drive speed may be equal to, or faster than, the first drive speed.

According to an aspect of the present invention, if a third low noise mode, to control noise generated in the print standby state and in the printing state, is selected from among the plurality of low noise modes, the controller may control the laser scanning unit to not be driven in the print standby state, and may control the laser scanning unit to be driven at a drive speed slower than the normal speed when the printing state is initiated.

According to an aspect of the present invention, if no low noise mode is selected, the controller may control the laser scanning unit to be driven at a drive speed equal to, or slower than, the normal speed, and may control the laser scanning unit to be driven at the normal speed when the printing state is initiated.

According to an aspect of the present invention, the image forming apparatus may further include a display unit. The user interface unit may display the user interface on the display unit, or on a display of a host device.

According to another exemplary embodiment of the present invention, there is provided a method for reducing noise in an image forming apparatus comprising a laser scanning unit, the method including: providing a plurality of low noise modes in order to perform noise reduction in each state of the image forming apparatus, by displaying a user interface; and controlling the driving of the laser scanning unit and a print speed, according to a low noise mode selected through the user interface.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1:
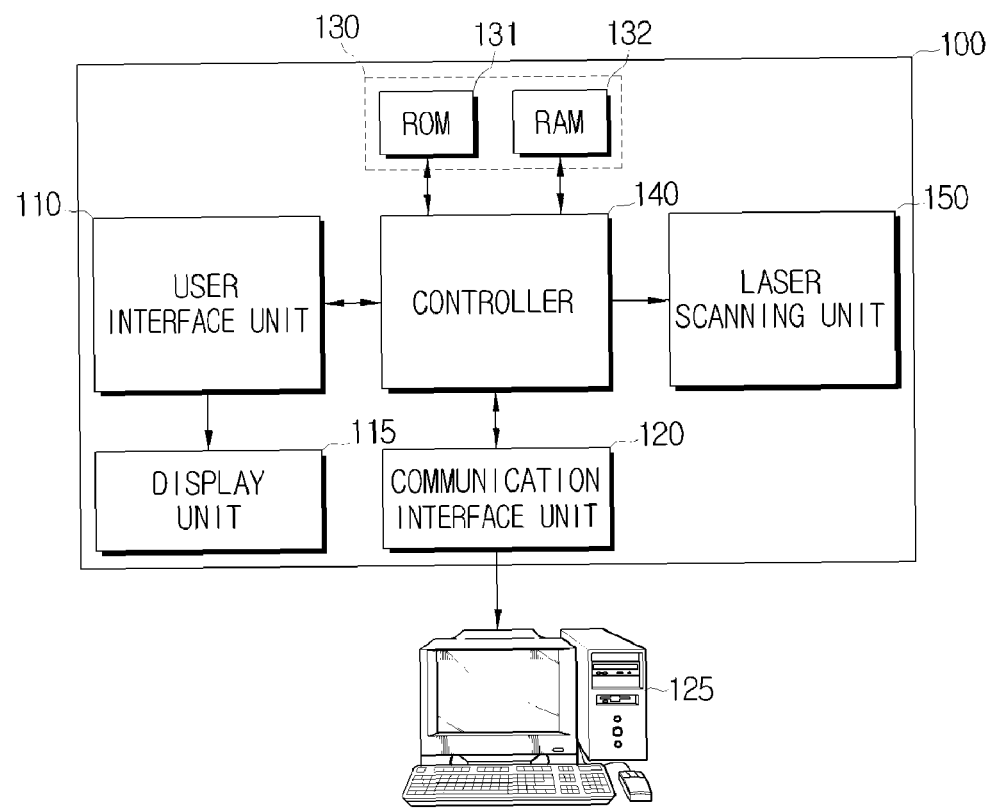
FIG. 1 is a block diagram of an image forming apparatus, according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below, in order to explain the aspects of the present invention, by referring to the figures.

FIG. 1 is a block diagram of an image forming apparatus 100, according to an exemplary embodiment of the present invention. The image forming apparatus 100 includes a user interface unit 110, a communication interface unit 120, a storage unit 130, a controller 140, and a laser scanning unit 150. The image forming apparatus 100 can comprise a display unit 115. The communication interface unit 120 can connect the image forming apparatus 100 to an external host device 125.

The user interface unit 110 displays a user interface (UI) to select one or more low noise modes. The low noise modes can be selected, in order to perform noise reduction in operational states of the image forming apparatus 100. Here, the UI may be displayed on the display unit 115, which is included on a panel of the image forming apparatus 100.

The operational states include a print standby state and a printing state, of the image forming apparatus 100. The print standby state is a state in which the laser scanning unit 150 is driven before the print data is received. The printing state is a state in which the laser scanning unit 150 is driven to perform printing, after the print data is received.

The plurality of low noise modes include: a first low noise mode (low noise standby mode) to control noise generated when the image forming apparatus 100 is in the print standby state; a second low noise mode (low noise printing mode) to control noise generated in the printing state; and a third low noise mode (general low noise mode) to control noise generated in the print standby state and in the printing state.

Figure 2:
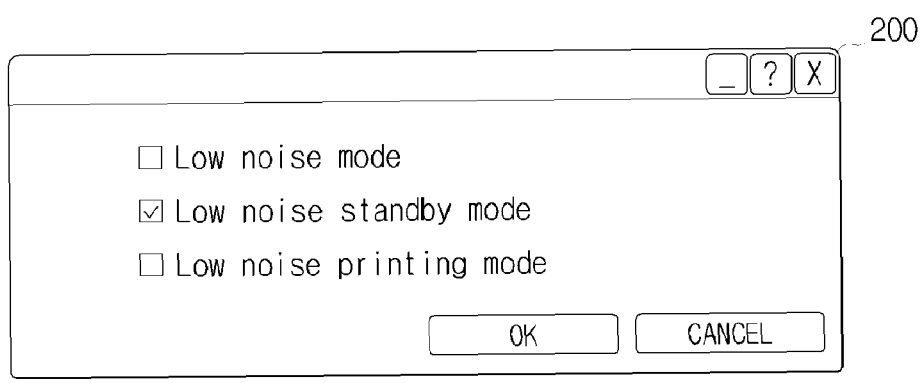
FIGS. 2 and 3 are exemplary views showing user interfaces, according to an exemplary embodiments of the present invention.
Figure 3:
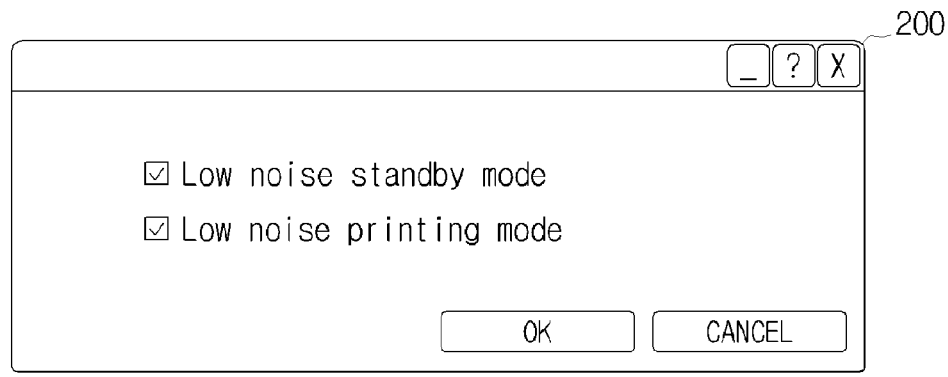

There may be various types of UIs, as shown in FIGS. 2 and 3. FIGS. 2 and 3 are exemplary views showing a UI, according to an exemplary embodiment of the present invention. A user may select a general low noise mode, a low noise standby mode, and a low noise printing mode, through a UI 200, as shown in FIG. 2. If the user does not select any of the modes, a general operation (default) mode of the image forming apparatus 100 may be executed.

According to some exemplary embodiments, the user selects the general low noise mode and a UI may be provided, which has no selection window to select the low noise standby mode and the low noise printing mode. If the low noise standby mode is selected, as shown in FIG. 3, the controller 140 may control driving of the laser scanning unit 150, according to the selected low noise mode.

FIG. 3 shows another UI 200, through which a user may select the low noise standby mode, or the low noise printing mode. In this situation, the user may select both the low noise standby mode and the low noise printing mode. Although the UI 200 is implemented as shown in FIGS. 2 and 3, in this exemplary embodiment of the present invention, various types of UI may be used. The user can select the general (default) operation mode, by not selecting any of the low noise modes. In other words, if the user does not select a low noise mode, the controller 140 defaults to the general operation mode. In the general operation mode, a general operation of the image forming apparatus 100 may be executed.

The controller 140 controls the driving of the laser scanning unit 150, according to the selected low noise modes. A process by which the controller 140 controls the driving of the laser scanning unit 150, according to the type of low noise mode, will be described in detail below.

The communication interface unit 120 may transmit data to, or receive data from, the external host device 125. The UI to select the low noise modes may be transmitted to the external host device 125, through the communication interface unit 120. When the external host 125 device requests the UI, the UI may be transmitted to the external host device 125. Additionally, the UI may be displayed by a driver of the image forming apparatus 100, which is included in the external host device 125. The communication interface unit 120 may receive print data and control signals to control the low noise modes, provided through the UI, from the external host device 125.

The storage unit 130 includes a read only memory (ROM) 131 and a random access memory (RAM) 132. The ROM 131 stores control programs required to drive the controller 140, and various application programs. The RAM 132 temporarily stores the print data received from the external host device 125, through the communication interface unit 120, and a variety of data created by programs of the controller 140.

The ROM 131 may store commands to drive the laser scanning unit 150, which correspond to each of the plurality of low noise modes. The RAM 132 may store the control signals received from the external host device 125.

The controller 140 controls the entire operation of the image forming apparatus 100, according to the control programs stored in the ROM 131. For example, the controller 140 may determine driving conditions to drive the laser scanning unit 150, according to the low noise mode selected by the user. The controller 140 may control the laser scanning unit 150, so that printing may be performed according to the determined conditions.

The driving conditions may include information indicating whether the laser scanning unit 150 is driven, and the drive speed of the laser scanning unit 150. The printing process speed of the print data may differ, according to the driving conditions.

If at least one low noise mode is selected, through either the UI provided by the image forming apparatus 100, or the UI provided by the external host device 125, the controller 140 may control whether the laser scanning unit 150 is driven, and may control the print speed in the selected low noise mode. Additionally, the controller 140 may adjust when a laser diode of the laser scanning unit 150 performs scanning, and the number of times a polygonal mirror in the laser scanning unit 150 rotates, so that the print standby state and the printing state may be controlled.

The print standby state may be a state in which the laser scanning unit 150 is driven before the print data is received. Additionally, the printing state may include not only a state in which the laser scanning unit 150 is driven, but also states in which a developing device, a transferring roller, or a fixing device are driven.

Specifically, if the first low noise mode is selected, to control noise generated in the print standby state, the controller 140 may control the laser scanning unit 150 not to be driven in the print standby state. In this situation, if printing is initiated, the controller 140 may cause the laser scanning unit 150, the developing device, the transferring roller, and the fixing device to be driven at a normal speed.

If the second low noise mode is selected, to control noise generated in the printing state, the controller 140 may control the laser scanning unit 150 to be driven at a first drive speed in the print standby state, and may control the laser scanning unit 150 to be driven at a second drive speed when printing is initiated. Here, the first drive speed and second drive speed are slower than the normal speed, and the second drive speed may be equal to, or faster than, the first drive speed.

The controller 140 may adjust a duty ratio of a drive pulse signal applied to a drive motor (not shown), which is used to drive the laser scanning unit 150, and may control the rotational speed of the drive motor. Here, the duty ratio of the drive pulse signal is the proportion of the "ON" time in one period of the drive pulse signal. For example, if the duty ratio at the normal speed is 100, a duty ratio at the first drive speed may be approximately 70, and a duty ratio at the second drive speed may be from approximately 70 to approximately 80.

If the third low noise mode is selected, to control noise generated in the print standby state and in the printing state, the controller 140 may control the laser scanning unit 150 to not be driven in the print standby state, and may control the laser scanning unit 150 to be driven at the second drive speed, which is slower than the normal speed, when printing is initiated.

If no low noise mode is selected, that is, if the general operation mode of the image forming apparatus 100 is selected, the controller 140 may control the laser scanning unit 150 to be driven at a drive speed that is equal to, or slower than, the normal speed. In this situation, if printing is initiated, the controller 140 may cause the laser scanning unit 150 to be driven at the normal speed. The printing process speed increases in the order of the general low noise mode, the first low noise mode, the second low noise mode, and the third low noise mode. The printing process speed may be provided to the user, according to the type of low noise mode, so the user may set the printing process speed.

Figure 4:
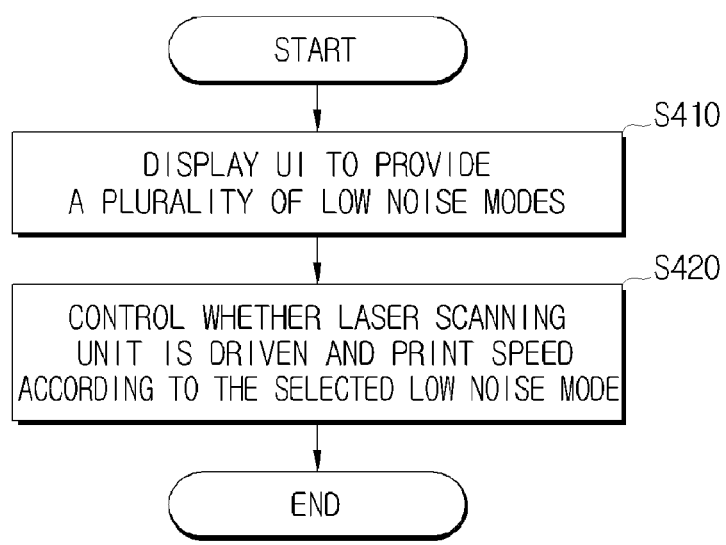
FIG. 4 is a flowchart explaining a method of reducing noise in an image forming apparatus, according to an exemplary embodiment of the present invention.

FIG. 4 is a flowchart explaining a method of reducing noise in an image forming apparatus, according to an exemplary embodiment of the present invention. In FIG. 4, a UI is displayed to provide a plurality of low noise modes, in order to perform noise reduction in each state of the image forming apparatus 100, in operation S410. The UI may be displayed on a display screen of the image forming apparatus 100, or on a display screen of the external host device 125.

The noise reduction may be performed in a print standby state, or in a printing state. The print standby state is a state in which the laser scanning unit 150 is driven before the print data is received. The printing state is a state in which the laser scanning unit 150 is driven to perform printing, after the print data is received.

The plurality of low noise modes may include the first low noise mode to control noise generated in the print standby state, the second low noise mode to control noise generated in the printing state, and the third low noise mode to control noise generated in the print standby state and in the printing state. If at least one low noise mode is selected through the UI, whether the laser scanning unit 150 is driven may be controlled, and the print speed may also be controlled in the selected low noise mode, in operation S420. A method of controlling the laser scanning unit 150, according to the selected low noise mode, will be described in detail with reference to FIGS. 5 to 8.

Figure 5:
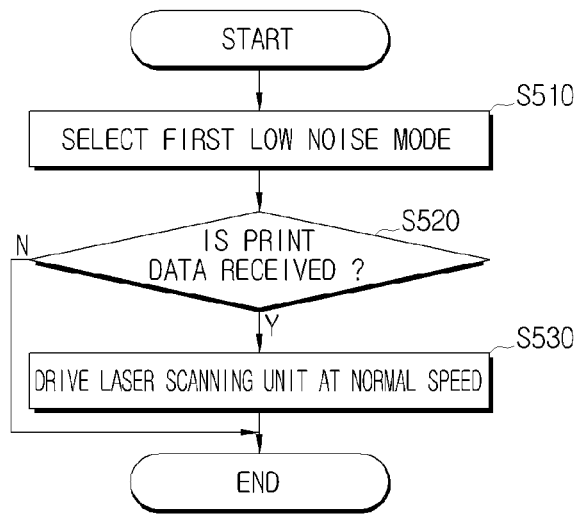
FIGS. 5 to 8 are flowcharts explaining a method of driving a laser scanning unit, according to the selection of low noise modes.

FIG. 5 is a flowchart explaining a method of driving a laser scanning unit, when the first low noise mode is selected. In FIG. 5, if the first low noise mode is selected in operation S510, the image forming apparatus 100 may determine whether to drive the laser scanning unit 150, according to whether the print data is received. In other words, if the print data is received in operation S520, the laser scanning unit 150 may be driven at the normal speed.

Figure 6:
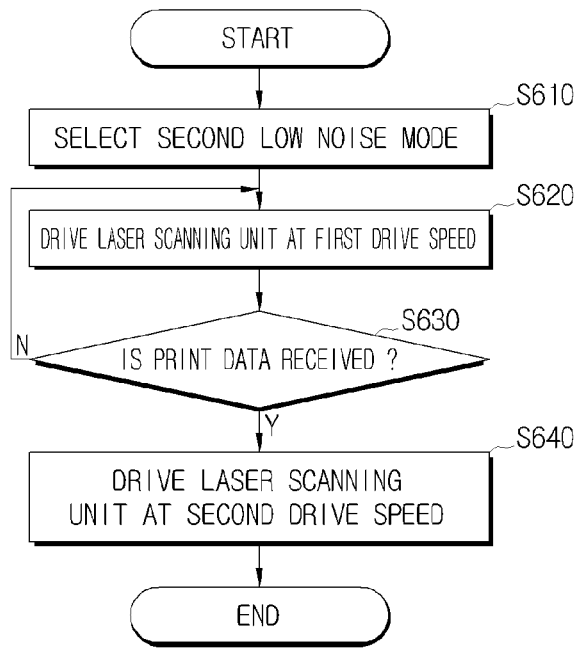

FIG. 6 is a flowchart explaining a method of driving a laser scanning unit, when the second low noise mode is selected. In FIG. 6, if the second low noise mode is selected in operation S610, the laser scanning unit 150 may be driven at the first drive speed in the print standby state, in operation S620. The image forming apparatus 100 may determine whether to drive the laser scanning unit 150 in the printing state, according to whether the print data is received. If the print data is received in operation S630, the laser scanning unit 150 may be driven at the second drive speed. The first drive speed and second drive speed are slower than the normal speed, and the second drive speed may be equal to, or faster than, the first drive speed.

Figure 7:
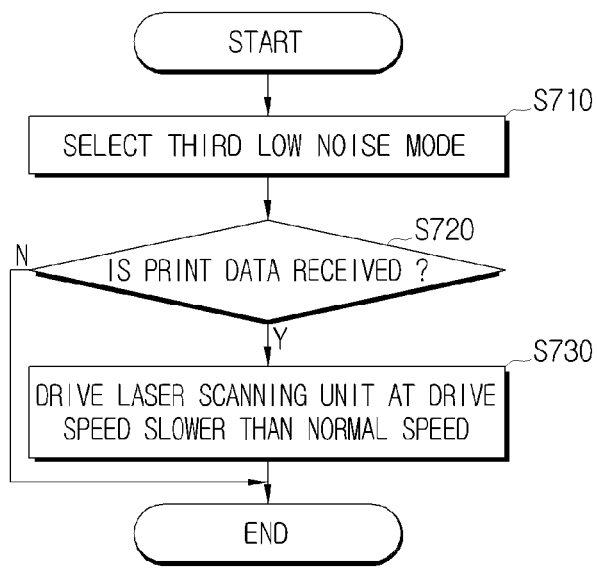

FIG. 7 is a flowchart explaining a method of driving a laser scanning unit, when the third low noise mode is selected. In FIG. 7, if the third low noise mode is selected in operation S710, the image forming apparatus 100 may determine whether to drive the laser scanning unit 150, according to whether the print data is received. In other words, if the print data is received in operation S720, the laser scanning unit 150 may be driven at a drive speed slower than the normal speed.

Figure 8:
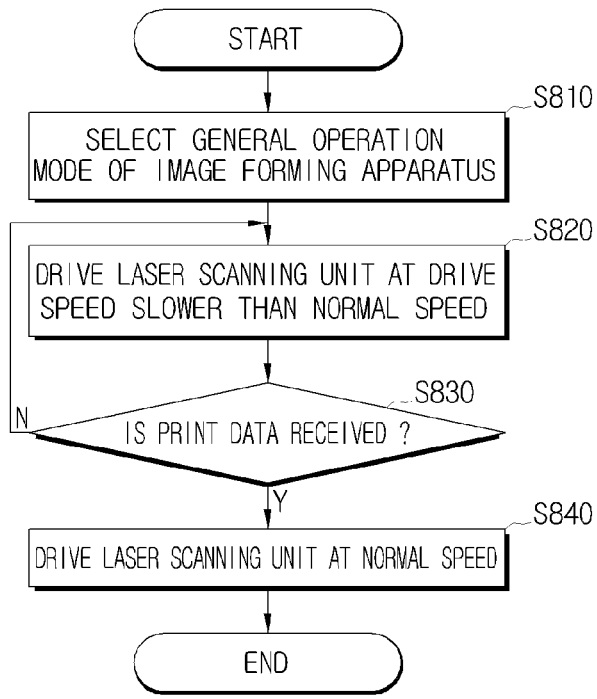

FIG. 8 is a flowchart explaining a method of driving a laser scanning unit when the image forming apparatus 100 operates in the general operation mode (when there is no low noise mode selected through the UI). In FIG. 8, if the general operation mode of the image forming apparatus 100 is selected in operation S810, the laser scanning unit 150 may be driven at a drive speed equal, to or slower than, the normal speed in the print standby state, in operation S820. The image forming apparatus 100 may determine whether to drive the laser scanning unit 150 in the printing state, according to whether the print data is received. If the print data is received in operation S830, the laser scanning unit 150 may be driven at a drive speed that is slower than the normal speed. Accordingly, it is possible to select one of the low noise modes, through the UI, so that printing noise generated in the print standby state and printing state may be reduced.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. An image forming apparatus comprising:
a user interface unit to display a user interface to select low noise modes to reduce noise produced during a print standby state and a printing state of the image forming apparatus; and
a controller to control driving of a laser scanning unit, according to the low noise modes selected through the user interface, the controller being adapted to control the print standby state and the printing state by adjusting a number of times a polygonal mirror in the laser scanning unit rotates when a laser diode of the laser scanning unit performs scanning based upon the selection.

2. The image forming apparatus of claim 1, wherein the low noise modes comprise a first low noise mode, during which the controller stops the driving of the laser scanning unit, when the image forming apparatus is in the print standby state.

3. The image forming apparatus of claim 1, wherein the low noise modes comprise a second low noise mode, during which the controller drives the laser scanning unit at a first drive speed, when the image forming apparatus is in the print standby state, and drives the laser scanning unit at a second drive speed, when the image forming apparatus is in the printing state.

4. The image forming apparatus of claim 3, wherein the first drive speed and second drive speed are slower than a normal drive speed and the second drive speed is at least equal to the first drive speed.

5. The image forming apparatus of claim 1, wherein the low noise modes comprise a third low noise mode, during which the controller stops the driving of the laser scanning unit, when the image forming apparatus is in the print standby state, and drives the laser scanning unit at a drive speed that is slower than a normal drive speed, when the image forming apparatus is in the printing state.

6. The image forming apparatus of claim 1, wherein if no low noise mode is selected, the controller drives the laser scanning unit at a drive speed that is no greater than a normal speed, when the image forming apparatus is in the print standby state, and drives the laser scanning unit at the normal speed, when the image forming apparatus is in the printing state.

7. The image forming apparatus of claim 6, wherein if no low noise mode is selected, the controller drives the laser scanning unit according to a general operation mode, which is selected by default, through the user interface.

8. The image forming apparatus of claim 1, further comprising a display unit, wherein the user interface unit displays the user interface on the display unit.

9. The image forming apparatus of claim 1, wherein the user interface unit displays the user interface on a display of a host device.

10. The image forming apparatus of claim 1, wherein the controller controls a print speed of the image forming apparatus, according to the low noise modes selected through the user interface.

11. The image forming apparatus of claim 1, the controller being adapted to adjust a duty ratio of a drive pulse signal applied to a drive motor, which is used to drive the laser scanning unit, and rotational speed of the drive motor.

12. A method for reducing noise in an image forming apparatus comprising a laser scanning unit, the method comprising:
  displaying a user interface comprising low noise modes to reduce noise in at least one of a print standby state and a printing state, of the image forming apparatus;
  making a selection from the user interface from the low noise mode; and
  driving the laser scanning, according to the selection,
  wherein the driving the laser scanning comprises adjusting a number of times a polygonal mirror in the laser scanning rotates when the laser scanning performs based upon the selection.

13. The method of claim 12, wherein:
  the making of the selection comprises selecting a first low noise mode; and
  the driving comprises stopping the laser scanning unit, when the image forming apparatus is in the print standby state.

14. The method of claim 12, wherein:
  the making of the selection comprises selecting a second low noise mode; and
  the driving comprises driving the laser scanning unit at a first drive speed, when the image forming apparatus is in the print standby state, and driving the laser scanning unit at a second drive speed, when the image forming apparatus is in the printing state.

15. The method of claim 14, wherein the first drive speed and second drive speed are slower than a normal drive speed, and the second drive speed is at least equal to the first drive speed.

16. The method of claim 12, wherein: the making of the selection comprises selecting a third low noise mode; and the driving comprises stopping the laser scanning unit, when the image forming apparatus is in the print standby state, and driving the laser scanning unit at a drive speed that is slower than a normal speed, when the image forming apparatus is in the printing state.

17. The method of claim 12, wherein:
  the making of the selection comprises selecting a general operation mode, by not selecting a low noise mode; and
  the driving comprises driving the laser scanning unit at a drive speed that is no greater than a normal drive speed, when the image forming apparatus is in the printing state, and driving the laser scanning unit at the normal speed, when the image forming apparatus is in the printing state.

18. The method of claim 17, wherein if no low noise mode is selected, the controller drives the laser scanning unit according to a general operation mode, which is selected by default, through the user interface.

19. The method of claim 12, wherein the user interface is displayed on a display of the image forming apparatus.

20. The method of claim 12, wherein the user interface is displayed on a display of a host device.

21. The method of claim 12, wherein the driving comprises controlling a print speed of the image forming apparatus, according to the selected low noise mode.

22. The method of claim 12, wherein the driving the laser scanning further comprises adjusting a duty ratio of a drive pulse signal applied to a drive motor, which is used to drive the laser scanning, and rotational speed of the drive motor.

* * * * *

UNITED STATES PATENT AND TRADEMARK OFFICE
CERTIFICATE OF CORRECTION

PATENT NO. : 8,213,058 B2  
APPLICATION NO. : 12/189937  
DATED : July 3, 2012  
INVENTOR(S) : Hyou-jin Kim et al.

Page 1 of 1

It is certified that error appears in the above-identified patent and that said Letters Patent is hereby corrected as shown below:

Title Page, Item (75) (Inventors), Line 2, Delete "Hwanseong-si, KR" and insert -- Hwaseong-si, KR --, therefor.

Column 7, Line 38 (Approx.), In Claim 12, delete "mode;" and insert -- modes; --, therefor.

Signed and Sealed this  
Twentieth Day of November, 2012

David J. Kappos  
*Director of the United States Patent and Trademark Office*